United States Patent
Py et al.

(10) Patent No.: US 9,102,374 B2
(45) Date of Patent: Aug. 11, 2015

(54) METHOD FOR ELABORATING AN ASSEMBLY COMPRISING AT LEAST THREE PARTS, A SUB-ASSEMBLY AND ASSEMBLY OBTAINED BY SAID METHOD

(71) Applicant: FAURECIA AUTOMOTIVE COMPOSITES, Nanterre (FR)

(72) Inventors: Jean Py, Entrammes (FR); Yannick Amosse, Carquefou (FR); Jean-Baptiste Cassard, Change (FR)

(73) Assignee: FAURECIA AUTOMOTIVE COMPOSITES, Nanterre (FR)

( * ) Notice: Subject to any disclaimer, the term of this patent is extended or adjusted under 35 U.S.C. 154(b) by 332 days.

(21) Appl. No.: 13/687,596

(22) Filed: Nov. 28, 2012

(65) Prior Publication Data

US 2013/0136529 A1    May 30, 2013

(30) Foreign Application Priority Data

Nov. 28, 2011 (FR) ...................... 11 60869

(51) Int. Cl.
*B62D 65/02* (2006.01)
*B23K 31/02* (2006.01)
(Continued)

(52) U.S. Cl.
CPC ................. *B62D 65/02* (2013.01); *B23K 31/02* (2013.01); *B23P 11/00* (2013.01); *F16B 17/008* (2013.01); *B29C 65/56* (2013.01); *B29C 66/721* (2013.01); *B29C 66/742* (2013.01);
(Continued)

(58) Field of Classification Search
CPC ......... B62D 65/02; F16B 17/008; F16B 5/07; B23P 11/00; B32K 31/02; Y10T 29/49945; Y10T 29/49936; Y10T 29/49924; Y10T 29/49922; Y10T 403/471; Y10T 29/49908; Y10T 29/49904; B29L 2031/3002; B29C 65/56; B29C 66/721; B29C 66/742
USPC ................... 29/505, 469, 513, 514, 521, 525, 29/525.14, 428; 403/266; 228/220
See application file for complete search history.

(56) References Cited

U.S. PATENT DOCUMENTS

| | | |
|---|---|---|
| 2002/0185207 A1 | 12/2002 | Iwanczyk |
| 2011/0039062 A1 | 2/2011 | Bishop |

FOREIGN PATENT DOCUMENTS

| | | |
|---|---|---|
| DE | 8805874 U1 | 8/1988 |
| EP | 1225000 A1 | 7/2002 |

(Continued)

OTHER PUBLICATIONS

French Search Report dated Jul. 23, 2012, which issued during the prosecution of French Patent Application No. 1160869.

*Primary Examiner* — John C Hong
(74) *Attorney, Agent, or Firm* — Troutman Sanders LLP

(57) ABSTRACT

A method for elaborating an assembly which includes at least one composite structure part, one metal interface part and one metal structure part, said method includes a first step for assembling the part to the part in order to form a sub assembly and a second assembling step for welding the interface part of said sub assembly to part. The composite structure and metal interface parts are pre-equipped with male/female type mating connections and with locking devices locking the connection. The method can include, during the first assembling step, a phase for pre-assembling the parts by interlocking the male/female mating connections and a phase for locking said interlock by deforming by pressing at least one portion of the locking devices pre-equipped in the metal interface.

11 Claims, 7 Drawing Sheets

(51) Int. Cl.
    *B23P 11/00*   (2006.01)
    *F16B 17/00*   (2006.01)
    *B29C 65/00*   (2006.01)
    *F16B 5/07*    (2006.01)
    *B29L 31/30*   (2006.01)
    *B29C 65/56*   (2006.01)
(52) U.S. Cl.
    CPC ........... *B29L 2031/3002* (2013.01); *F16B 5/07* (2013.01); *Y10T 29/49922* (2015.01); *Y10T 29/49924* (2015.01); *Y10T 29/49936* (2015.01); *Y10T 29/49945* (2015.01); *Y10T 403/471* (2015.01)

(56) References Cited

FOREIGN PATENT DOCUMENTS

| | | |
|---|---|---|
| EP | 1923577 A1 | 5/2008 |
| WO | 2009138709 A1 | 11/2009 |

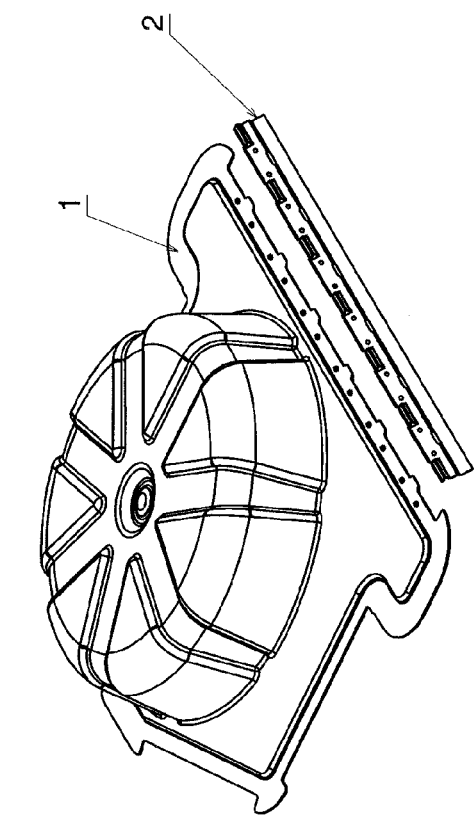
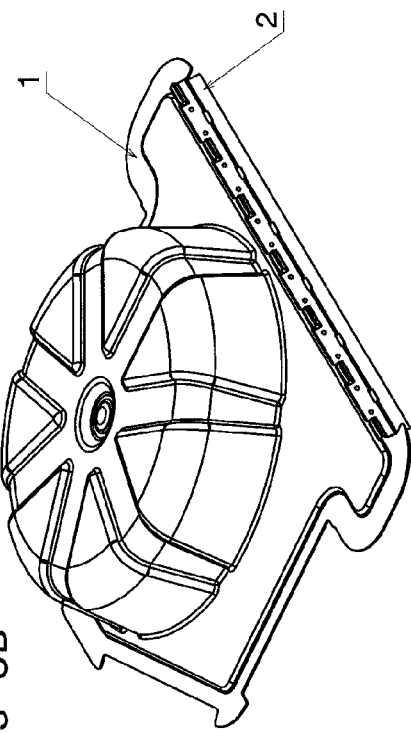
Figures 5A    Figures 5B
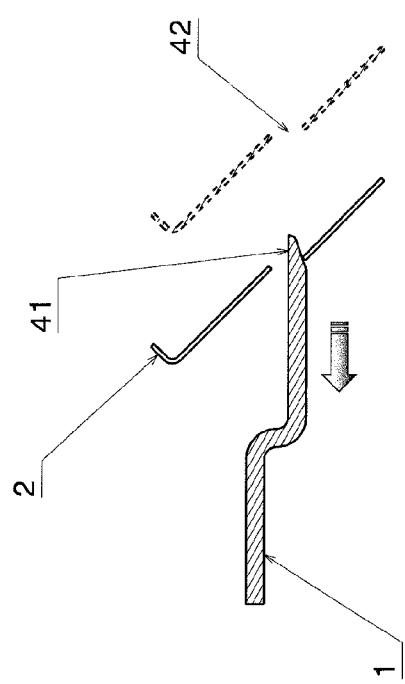
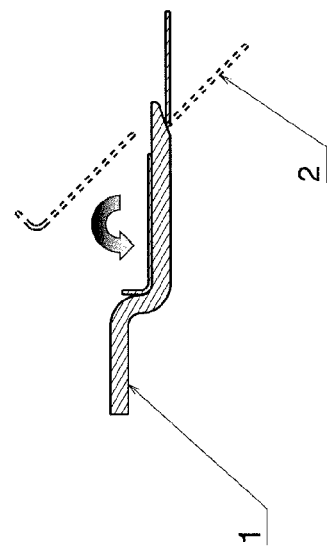

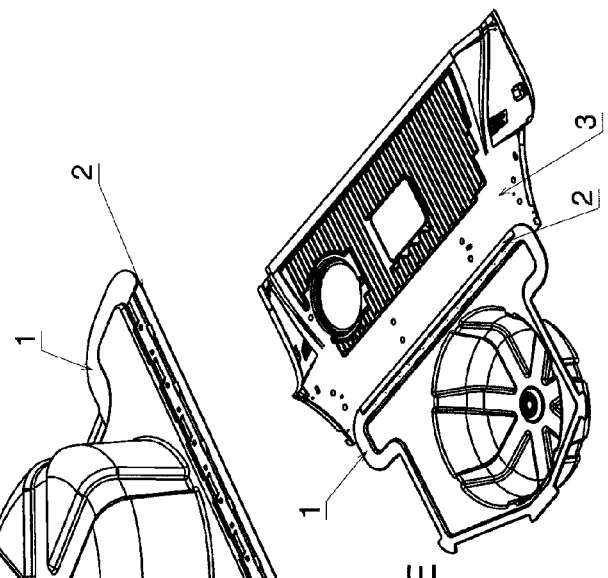
Figure 5E
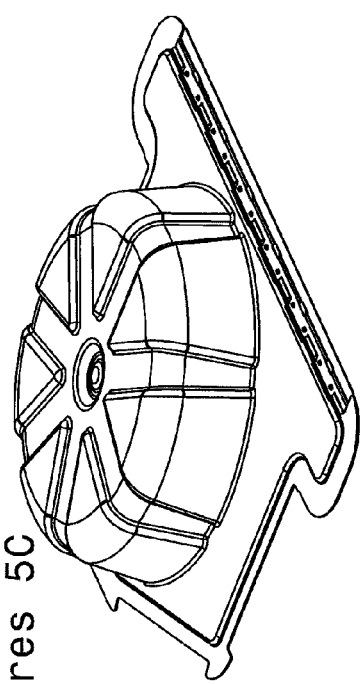
Figures 5C
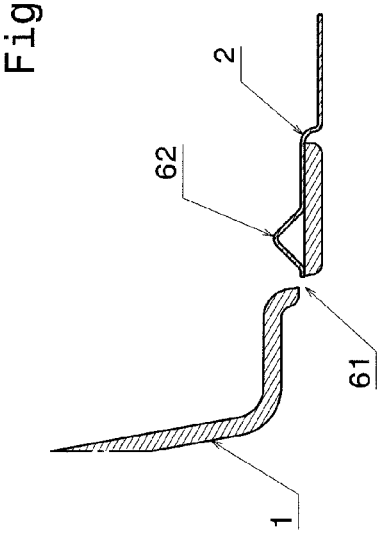
Figures 5D
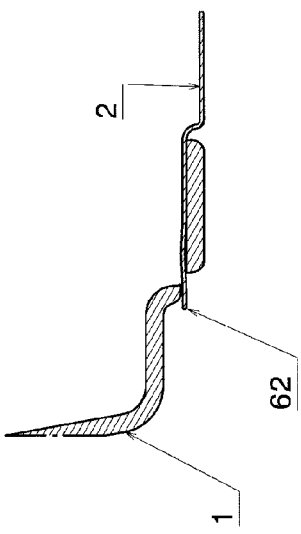

METHOD FOR ELABORATING AN ASSEMBLY COMPRISING AT LEAST THREE PARTS, A SUB-ASSEMBLY AND ASSEMBLY OBTAINED BY SAID METHOD

CROSS REFERENCE TO RELATED APPLICATIONS

The present application claims priority to French Application No. 1160869 filed on Nov. 28, 2011. This application is incorporated herein by reference.

BACKGROUND

The present invention relates to a method for elaborating an assembly comprising at least one composite structure part, one metal interface part and one metal structure part, to a sub-assembly and to the assembly obtained by said method.

For making many products, such as in particular motor vehicles, it is necessary to assemble together composite parts and metal parts.

In the case of mass production, the assembling should be accomplished within a short time on a production line along which run the products.

In order to reduce the time for assembling the composite structure part to the metal structure part which runs on the line, the use of a metal interface part between the composite structure and the metal structure part is known, this metal interface part being intended to be spot-welded on the metal structure part, spot-welding being one of the rare assembling methods compatible with production cycle times and throughputs.

Up to now, the assembling between a composite structure part and a metal interface part is performed by adhesive bonding or by overmolding. Every time, the assembling method is long and the strength of the assembly is uncertain over time.

An object of the present invention is therefore to propose a novel method for pre-assembling the composite structure part to the metal interface part within a short time, without being detrimental to the ease of assembling the metal interface part to the metal structure part by welding.

Another object of the present invention is to propose a method for pre-assembling the composite structure part to the metal interface part, the design of which allows assembling while excluding any stress on the composite structure part in order to avoid adversely affecting the mechanical strength and damaging the composite structure part which does not accept stress concentrations.

SUMMARY

To this end, the object of the invention is a method for elaborating an assembly comprising at least one composite structure part, one metal interface part and one metal structure part according to an example:
  a step for assembling the composite structure to the metal interface part in order to form a sub-assembly and
  a step for assembling the metal interface part of said sub-assembly to the metal structure part by welding in order to form said assembly, characterized in that, as the composite structure and metal interface part are pre-equipped with assembling mating connecting means of the male/female type and with means for locking said connection, said method comprises, during the step for assembling the composite structure to the metal interface part for forming a sub-assembly, a phase for pre-assembling the composite structure part and the metal interface part by interlocking the so-called assembling male/female type connecting means and a phase for locking said interlock by deforming with pressing at least one portion of the locking means pre-equipping the metal interface part, said locking means preferably being assembling mating connecting means of the male/female type capable, in the assembled condition of said parts by their assembling connecting means, of passing by deformation with pressing, from the uncoupled condition to the coupled condition corresponding to the active locking configuration.

The pre-assembling phase by engagement of mating geometrical shapes of the composite structure part and of the metal interface part allows in a simple way, and without any stress on the composite structure part, rapid pre-positioning of said parts one relative to the other and limitation of the possibility of relative displacement of said parts one relative to the other.

The locking phase performed by simple deformation with pressing, preferably by means of a single press stroke, allows making sure that the pre-assembled parts are kept in the assembled condition.

The deformation of the locking means is performed on at least one portion of the locking means pre-equipping the metal interface parts and not, preferably on the portion of the locking means pre-equipping the composite structure part, so that the composite structure part remains unchanged.

Preferably, the locking means are mating connecting means of the male/female type distinct from assembling male/female mating connecting means.

Preferably, the portion of said locking means pre-equipping the metal interface part is the male portion of said locking means, this male portion of the locking means being the deformable portion of the locking means capable, in the assembled condition of said parts by their assembling connecting means, of passing by deformation with pressing, from the uncoupled condition of the locking means to the coupled condition of said locking means corresponding to the active locking configuration.

Preferably, as at least one portion of the locking means is formed for the metal interface part, with so-called locking tab(s), and for the composite structure part, with aperture(s) or lumen(s), said or each aperture or lumen being able to be positioned to match a tab, said method comprises, during the locking phase of said interlock, deformation by pressing the locking tab(s) of the metal interface part in the direction for introducing said or each tab into the matching aperture or lumen of the composite structure part.

Again, this assembling solution is rapid, since it may be achieved by simple pressing, notably in a single press stroke, and reliable since it does not stress the composite structure part.

Preferably, said or each locking tab has a V-shaped cross-section, during the locking phase, said tab is deformed by flattening the V.

Preferably, the connecting means for assembling the composite structure and metal interface parts comprising at least two series of connecting means, during the pre-assembling phase, the first series of assembling male/female connecting means is assembled together and then the second series of assembling male/female connecting means is assembled together.

These two series of assembling connecting means allow obtaining rapid and reliable pre-positioning of said parts one relative to the other.

Preferably, as the first series of assembling connecting means is of the tab/aperture type and the second series of assembling connecting means is of the stud/aperture type, said apertures being preferably borne by the metal interface part, during the pre-assembling phase, the tab(s) of the first series of connecting means of the composite structure part is (are) introduced inside the aperture(s) matching the metal interface part and then, by angular displacement of the parts relatively to each other around said connection, the parts are brought closer to each other until studs of the second series of means for connecting the composite structure part are positioned inside matching apertures of the metal interface part, and during the locking phase, at least one portion of the locking means is deformed by pressing in order to have said locking means pass from an inactive configuration to an active configuration, in which any angular displacement of the parts in the direction in which the studs emerge from the apertures is limited or prevented.

The object of the invention is further an assembly capable of being elaborated by applying a method compliant with the one described above, said assembly comprising at least one composite structure part, one metal interface part and one metal structure part, the composite structure part and the metal interface part forming a sub-assembly welded, via the metal interface part, to the metal structure part, characterized in that the composite structure and the metal interface part are, in order to keep them in the assembled condition, provided with so-called assembling mating connecting means of the male/female type and with locking means pre-equipping said parts, at least one portion of said locking means pre-equipping the metal interface part being deformable means capable of passing, under the effect of pressure, from an inactive configuration to an active configuration, in the assembled condition of said parts by their assembling mating connecting means.

Preferably, at least one portion of the locking means is formed, for the metal interface part, with so-called locking tab(s), and for the composite structure part with aperture(s) or lumen(s), each aperture or lumen being able to be positioned matching a tab in the pre-assembled condition of said parts by their assembling connecting means, said or each locking means being a deformable tab capable, under the effect of being pressed, of deforming in the direction in which the tab is introduced into the matching aperture or lumen of the composite structure part, in the pre-assembled condition of said parts by their assembling connecting means.

Preferably, said or each locking tab of the metal interface part has a V-shaped cross section before deformation.

Preferably, the connecting means for assembling the composite structure and metal interface parts are connecting means comprising at least two series of connecting means.

Preferably, the first series of assembling connecting means is of the tab/aperture type and the second series of assembling connecting means is of the stud/aperture type, said apertures being preferably borne every time by the metal interface part.

Preferably, the assembling connecting means of each of the locking series and means are each organized as a row of connecting or locking members, said rows being on a same part parallel with each other.

The object of the invention is further a sub-assembly of the type comprising a composite structure and a metal interface part, said sub-assembly being intended, via its metal interface part, to be welded to a metal structure part in order to form an assembly compliant with the one described above, characterized in that the composite structure part and the metal interface part are, in order to keep them in the assembled condition, provided with so-called assembling mating connecting means of the male/female type and with locking means pre-equipping said parts, at least one portion of said locking means being deformable means capable of passing, under the effect of pressure and in the assembled condition of said parts by their assembling connecting means, from an inactive configuration to an active configuration, at least one portion of these locking means being formed, for the metal interface part with so-called locking tab(s) and, for the composite structure part with aperture(s) or lumen(s), each aperture or lumen being able to be positioned matching a tab, said or each tab being a deformable tab capable, under the effect of pressing, of deforming in the direction for introducing the tab into the matching aperture or lumen of the composite structure part in the pre-assembled condition of said parts by their assembling connecting means.

BRIEF DESCRIPTION OF THE DRAWINGS

The invention will be better understood upon reading the following description of exemplary embodiments, with reference to the appended drawings wherein:

FIGS. 5A to 5D illustrate every time as two parallel views, the different steps of the method for elaborating said assembly;

FIG. 5E illustrates the finished assembly.

DETAILED DESCRIPTION

Figure 1A:
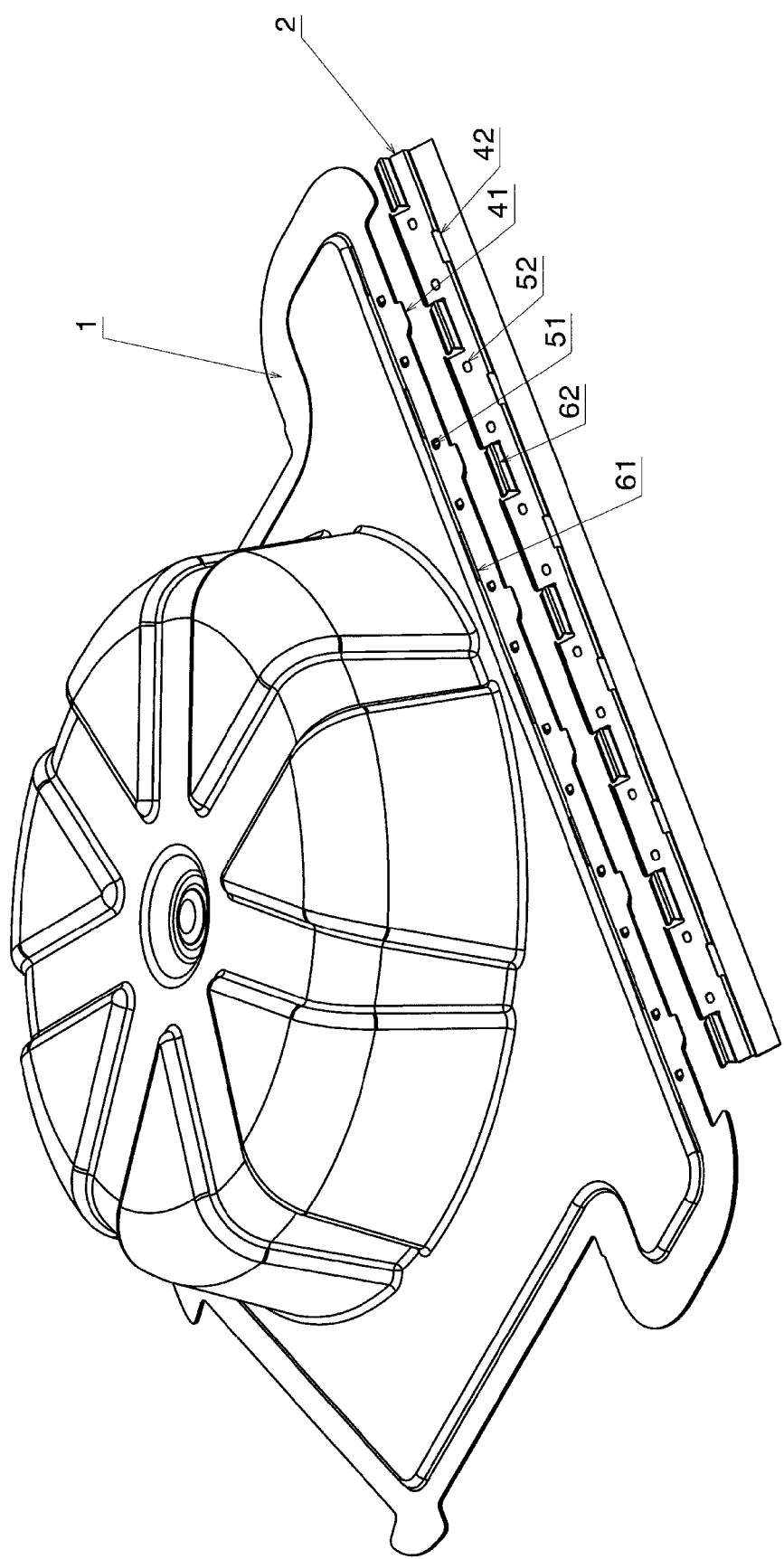
FIG. 1A illustrates a perspective view of a composite structure part ready for assembling with a metal interface part.
Figure 1B:
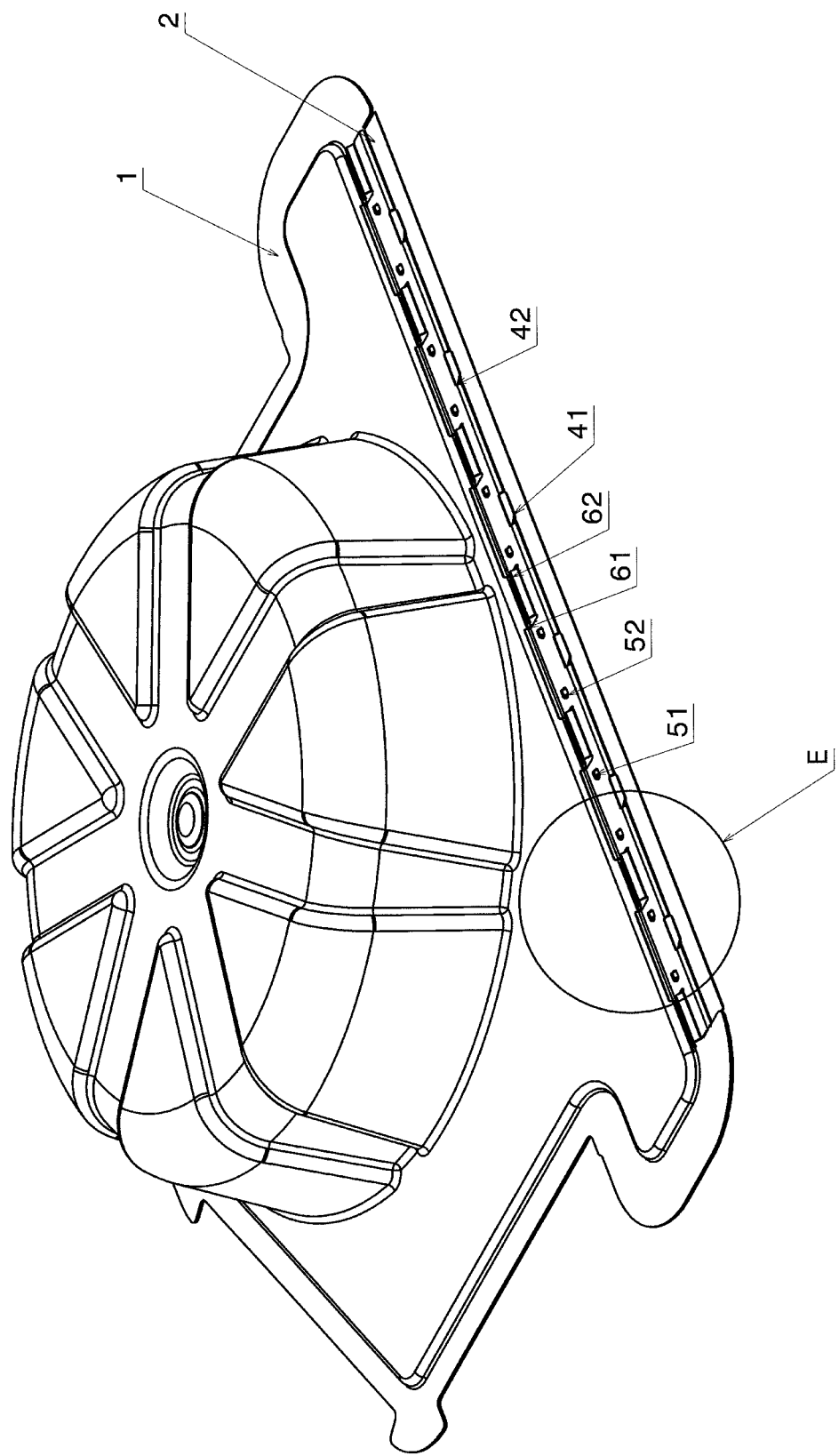
FIG. 1B illustrates a perspective view of a composite structure part in the assembled condition with a metal interface part.
Figure 2:
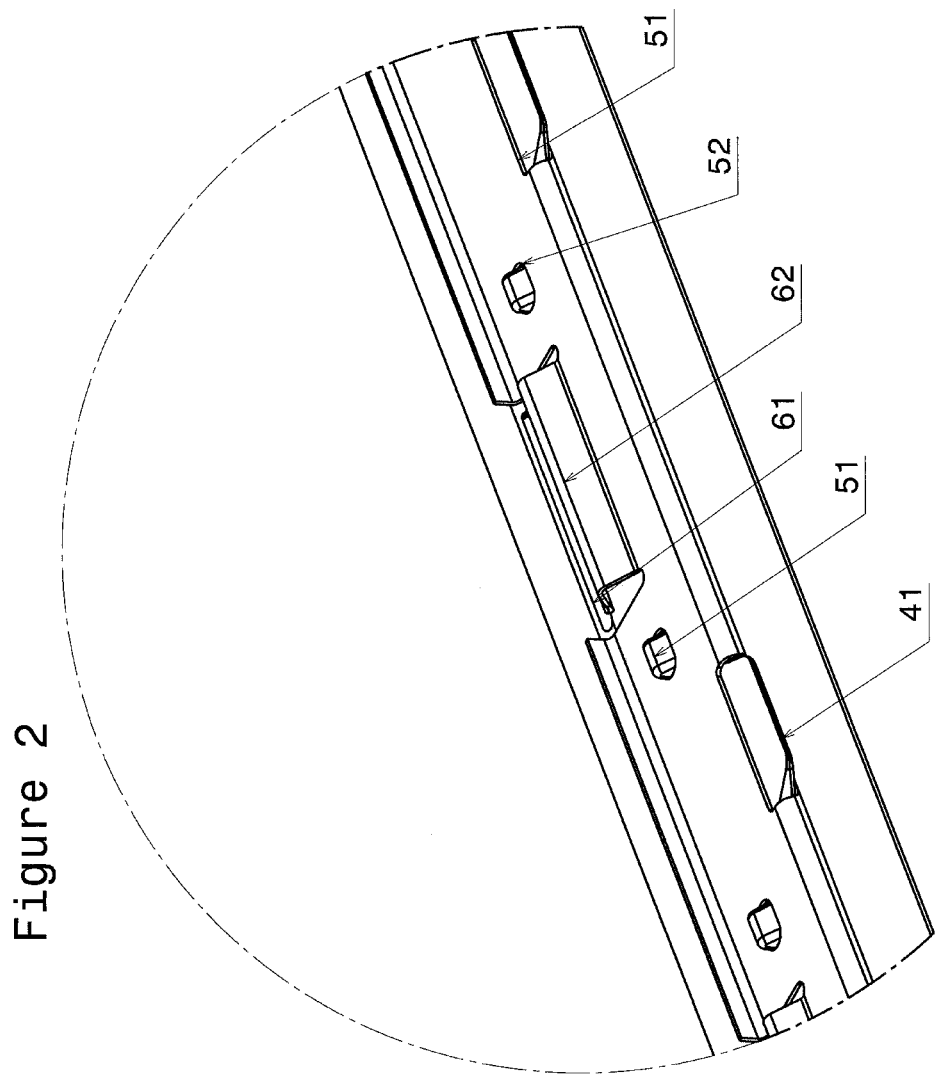
FIG. 2 illustrates a detailed view E of FIG. 1B.
Figure 3:
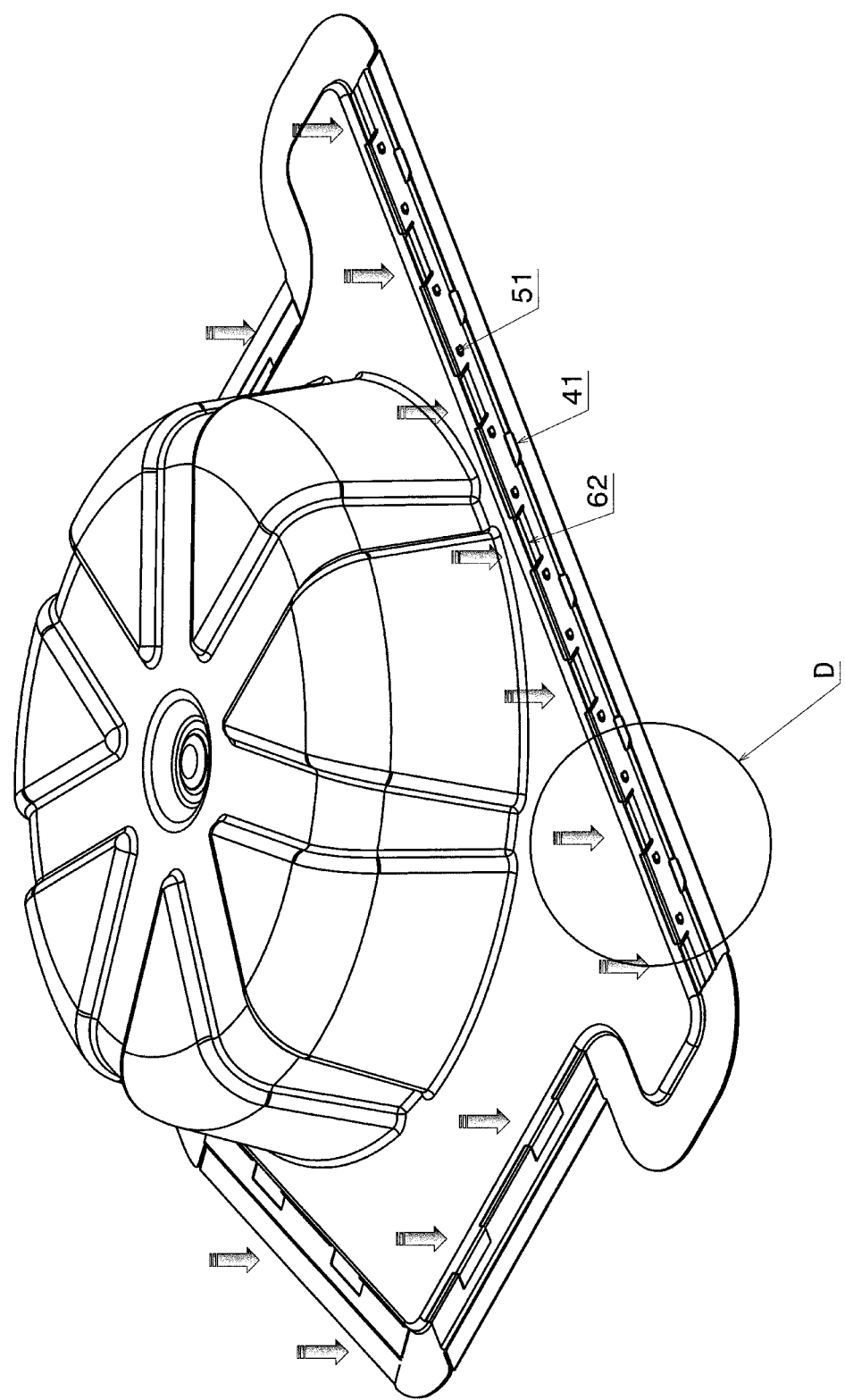
FIG. 3 illustrates a perspective view of a composite structure part in the locked condition with a metal interface part.
Figure 4:
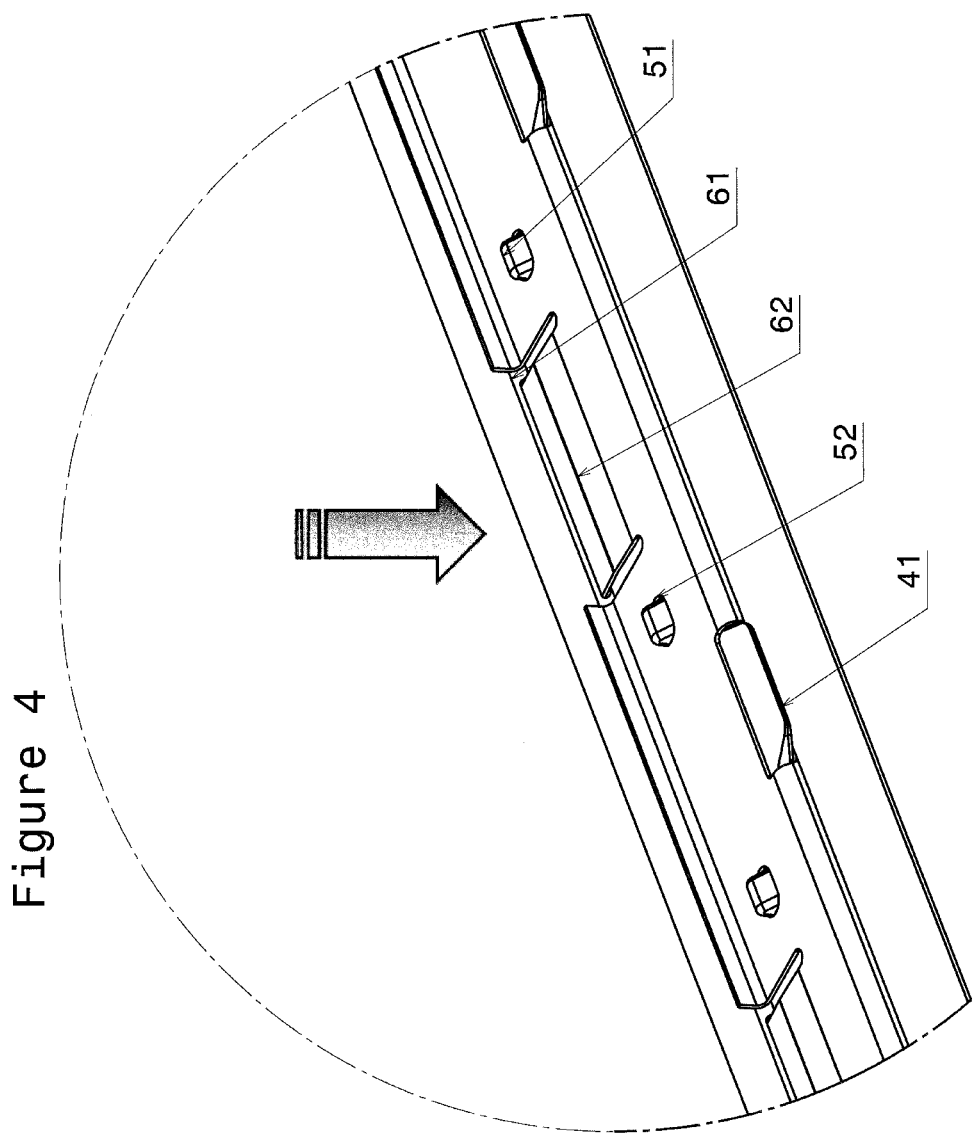
FIG. 4 illustrates a detailed view D of FIG. 3.

As mentioned above, the object of the invention is a method for elaborating an assembly comprising at least one composite structure part 1, one metal interface part 2 and one metal structure part 3, the achieved sub-assembly and the obtained assembly.

In the illustrated examples, the composite structure part 1 is a basin-shaped part capable of forming a spare wheel bin, the metal structure part 3 is a chassis of a rolling stock and the metal interface part 2 appears as an elongated body which may be positioned along an edge of said basin.

Of course, the invention is not limited to the illustrated application.

The invention more particularly applies to assemblies, the metal structure part of which is mass-produced on a production line, including parts to be added which have to be rapidly assembled, and generally by welding, to said metal structure part, as this is the case for example in the automotive field for chassis or bodies of vehicles.

As mentioned above, the method comprises a step for assembling the composite structure part 1 to the metal interface part 2 in order to form a sub-assembly, and a step for assembling by welding the metal interface part 2 of said sub-assembly to the metal structure part 3 in order to form said assembly.

The composite structure 1 and metal interface 2 parts are pre-equipped with mating connection means 41, 42; 51, 52 of the assembling male/female type and with means 61, 62 for locking said connection.

In the illustrated examples, the connection means 41, 42; 51, 52 for assembling the composite structure 1 and metal interface 2 parts are connection means comprising at least two series of connection means.

The first series of assembling connection means 41; 42 are of the tab/aperture type and the second series 51; 52 of assembling connection means are of the stud/aperture type, said apertures being borne every time by the metal interface part 2. Of course, the apertures could have been made on the composite structure part 1. Also, the solution in which the tabs are made on the metal interface part 2 and the studs on any of the parts, is not excluded.

The locking means are also mating connecting means of the male/female type capable, in the assembled condition of said parts by their assembling connecting means, of passing by deformation with pressing of the portion of the locking means pre-equipping the metal interface part 2, from the uncoupled condition of said locking means to the coupled condition of said locking means corresponding to the active locking configuration.

In the illustrated examples, the portion of the locking means pre-equipping the metal interface part 2 is the male portion of the locking means.

This portion of the locking means pre-equipping the metal interface part 2 is formed with so-called locking tabs 62.

The portion of the locking means pre-equipping the composite structure part 1 is formed with apertures or lumens 61. Each aperture 61 or lumen is able to be positioned matching a tab 62 in the pre-assembled condition of parts 1, 2 by their assembling connecting means.

Said or each locking tab 62 is a deformable tab capable, under the effect of pressing, of deforming in the direction for introducing the tab 62 into the matching aperture 61, or lumen of the composite structure part 1, in the assembled condition of said parts by their assembling connecting means 41, 42; 51, 52.

In particular, in the illustrated examples, the metal interface part 2 is equipped with several locking tabs 62 each having a V-shaped cross section before deformation.

Because of the assembling means and of the locking means, as described above, the composite structure part 1 therefore includes, from its external peripheral edge towards its center, a row of tabs 41 made by matching the edge of said part, a row of studs 51 and a row of lumens 61, said rows being parallel with each other.

The metal interface part 2 includes before assembling, a row of deformable locking tabs 62 made along an edge of said part, a row of bore holes or punched holes 52 capable of housing the studs 51 and a row of lumens 42 capable of housing the assembling tabs 41.

Said method therefore comprises during the assembling step, a phase for pre-assembling the composite structure part 1 and the metal interface part 2 by interlocking of the so-called assembling male/female mating connection means 41, 42; 51, 52, and a phase for locking said interlock by deformation with pressing of at least one portion of the locking means 61, 62 pre-equipping the metal interface part 2.

In particular, during the pre-assembling phase, the tab(s) of the first series of connecting means of the composite structure part 1 is (are) introduced inside the aperture(s) 42 matching the metal interface part 2, and then by angular displacement of the parts 1, 2 one relative to the other around the connection, the parts are brought closer to each other until studs 51 of the second series of connection means of the composite structure part 1 are positioned inside the matching apertures 52 of the metal interface part 2, and during the locking, at least one portion of the locking means are deformed by pressing. In this case, each tab 62 is deformed by flattening the V of said tab for having the locking means pass from an inactive configuration to an active configuration in which each tab 62 penetrates into the matching aperture 61 made in the composite structure part 1, so that, in the locked condition, any angular displacement of the parts 1, 2 in the direction in which the studs emerge from the apertures, is limited or prevented.

The parts are thereby perfectly assembled together without any stress during this assembling of the composite structure part 1.

The invention claimed is:

1. A method for elaborating an assembly comprising at least one composite structure part, one metal interface part and one metal structure part, said method comprising:
   a step for assembling the composite structure part to the metal interface part in order to form a sub-assembly and
   a step for assembling by welding the metal interface part of said sub-assembly to the metal structure part in order to form said assembly,
   wherein, as the composite structure and metal interface parts are pre-equipped with assembling mating connectors of a male/female type and with connection locks locking said connection, said method comprises, during the step for assembling the composite structure part to the metal interface part in order to form a sub-assembly, pre-assembling the composite structure part and the metal interface part by interlocking the assembling male/female mating connectors by an interlock and
   locking said interlock by deformation by pressing at least one portion of the connection locks pre-equipping the metal interface part, said connection locks being a mating connection of the male/female type, distinct from the assembling male/female mating connectors and being capable, in an assembled condition of said parts by their assembling connectors, of passing by deformation by simple pressing from a simple press stroke, from an uncoupled condition to a coupled condition corresponding to an active locking position and
   wherein as at least one portion of the connection locks is formed, for the metal interface part with a locking tab, and for the composite structure part, with at least one of an aperture or lumen, said aperture or lumen being able to be positioned matching a tab,
   said method further comprises, during locking said interlock, deformation by pressing the locking tab of the metal interface part in the direction for introducing said each tab into the corresponding aperture or lumen of the composite structure part.

2. The method according to claim 1, wherein,
   said locking tab has a V-shaped cross-section, and during a locking phase, said tab is deformed by flattening the V.

3. The method according to claim 1, wherein,
   a pre-assembling phase, a first series of assembling male/female connectors is assembled together and then a second series of assembling male/female connectors is assembled together.

4. The method according to claim 3, wherein,
   the first series of assembling connectors being of a tab/aperture type and in that the second series of connectors being of a stud/aperture type, said apertures being preferably carried by the metal interface part, during the pre-assembling phase, the tab of the first series of connectors of the composite structure part is introduced inside the corresponding aperture of the metal interface part and then, by angular displacement of the parts one relative to the other around said connections, the parts are brought closer to each other until studs of the second series of connectors of the composite structure part are positioned inside matching apertures of the metal interface part and in that during the locking phase, at least one portion of the connection locks is deformed by pressing, for having locking means pass from an inactive configuration to an active configuration, wherein any angular displacement of the parts, in the direction for having the studs emerge from the apertures, is limited or prevented.

5. An assembly capable of being elaborated by applying a method according to claim 1, said assembly comprising:

at least one composite structure part, one metal interface part and one metal structure part, the composite structure part and the metal interface part forming a sub-assembly welded via the metal interface part, to the metal structure part, the composite structure part and the metal interface part being, for maintaining them in the assembled condition, provided with assembling mating connectors of the male/female type and with connection locks pre-equipping said parts, at least one portion of said connection locks pre-equipping the metal interface part being a deformable portion, wherein the connection locks are mating connectors of the male/female type distinct from the assembling male/female mating connectors and in that at least one portion of the connection locks capable of passing under the effect of pressure, from an inactive configuration to an active configuration, in the assembled condition of said parts by their assembling mating connection means, is formed, for the metal interface part, with a locking tab, and for the composite structure part, with an aperture or lumen, each aperture or lumen being able to be positioned matching a tab in a pre-assembled condition of said parts by their assembling connector, said locking tab being a deformable tab capable, under the effect of pressing, of deforming in the direction for introducing the tab into the matching aperture or lumen of the composite structure part, in the pre-assembled condition of said parts by their assembling connectors.

6. The assembly according to claim 5, wherein said locking tab of the metal interface part before deformation has a V-shaped cross section.

7. The assembly according to claim 5, wherein the connectors assembling the composite structure metal interface part are connectors comprising at least two series of connectors.

8. The assembly according to claim 7, wherein the first series of assembling connectors is of the tab/aperture type and in that the second series of assembling connectors is of the stud/aperture type, said apertures being preferably each carried by the metal interface part.

9. The assembly according to claim 7, wherein the assembling connector of each of the series and the connection locks are each organized as a row of connecting or locking members, said rows being on a same part parallel with each other.

10. The assembly according to claim 5, wherein the composite structure part is a basin-shaped part capable of forming a spare wheel bin, in that the metal structure part is a chassis of rolling stock and in that the metal interface part appears as an elongated body able to be positioned along an edge of said basin.

11. A sub-assembly of the type comprising a composite structure part and a metal interface part, said sub-assembly being intended, via its metal interface part, to be welded to a metal structure part in order to form an assembly according to claim 5, wherein the composite structure part and the metal interface part are, for maintaining them in the assembled condition, provided with assembling male/female type mating connectors and with connection locks pre-equipping said parts, at least one portion of said connection locks being a deformable part capable of passing, under an effect of pressure and in the assembled condition of said parts by their assembling connectors, from an inactive configuration to an active configuration, at least one portion of these connection locks being formed, for the metal interface part, with a locking tab and for the composite structure part, with an aperture or lumen, each aperture or lumen being able to be positioned matching a tab, said tab being a deformable tab capable, under the effect of pressing, of deforming in the direction for introducing the tab into the matching aperture or the lumen of the composite structure part in the pre-assembled condition of said part by their assembling connectors.

* * * * *